(12) United States Patent
Shaheen

(10) Patent No.: US 8,072,948 B2
(45) Date of Patent: Dec. 6, 2011

(54) WIRELESS COMMUNICATION SYSTEM AND METHOD OF IMPLEMENTING AN EVOLVED SYSTEM ATTACHMENT PROCEDURE

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1214 days.

(21) Appl. No.: 11/485,082

(22) Filed: Jul. 12, 2006

(65) Prior Publication Data
US 2007/0019643 A1    Jan. 25, 2007

Related U.S. Application Data

(60) Provisional application No. 60/699,304, filed on Jul. 14, 2005.

(51) Int. Cl.
H04W 4/00    (2009.01)
(52) U.S. Cl. ...... 370/338; 370/328; 455/410; 455/435.1
(58) Field of Classification Search .......... 370/338, 370/328; 455/410, 435.1
See application file for complete search history.

(56) References Cited

U.S. PATENT DOCUMENTS

| | | | |
|---|---|---|---|
| 6,275,943 B1 | 8/2001 | Pentikainen et al. | |
| 6,636,491 B1 | 10/2003 | Kari et al. | |
| 6,839,338 B1 * | 1/2005 | Amara et al. ................. | 370/338 |
| 2003/0002480 A1 | 1/2003 | Giustina et al. | |
| 2003/0114158 A1 * | 6/2003 | Soderbacka et al. .......... | 455/436 |
| 2003/0153309 A1 | 8/2003 | Bjelland et al. | |
| 2004/0165577 A1 | 8/2004 | Ahn | |
| 2004/0240479 A1 | 12/2004 | Bohnhoff | |
| 2004/0248615 A1 | 12/2004 | Purkayastha et al. | |
| 2005/0009527 A1 | 1/2005 | Sharma | |
| 2005/0128963 A1 | 6/2005 | Gazda et al. | |
| 2005/0147061 A1 | 7/2005 | Francoeur et al. | |
| 2005/0288016 A1 * | 12/2005 | Kuchibhotla et al. ...... | 455/435.2 |

FOREIGN PATENT DOCUMENTS

| | | |
|---|---|---|
| WO | 02/32177 | 4/2002 |
| WO | 2005/039201 | 4/2005 |
| WO | 2005/057961 | 6/2005 |
| WO | 2005/057980 | 6/2005 |

OTHER PUBLICATIONS

Digital Cellular Telecommunications System (Phase 2+); Universal Mobile Telecommunications System (UMTS); Mobile Radio Interface Layer 3 Specification; Core Network Protocols; Stage 3, (3GPP TS 24.008 Version 6.9.0 Release 6), ETSI TS 124 008 V6.9.0 (Jun. 2005).

(Continued)

*Primary Examiner* — Nghi Ly
(74) *Attorney, Agent, or Firm* — Volpe and Koenig, P.C.

(57) ABSTRACT

A wireless communication system and method of implementing an evolved system attachment procedure are disclosed. The system includes a first core network and a second core network which is evolved from the first core network. A wireless transmit/receive unit (WTRU) sends an attach request message to the second core network. The second core network activates a packet data protocol (PDP) context and sends an attach accept message to the WTRU. The attach accept message includes information regarding the PDP context. The second core network constructs a session and mobility management (SMM) context for session management (SM) and mobility management (MM) for the WTRU.

20 Claims, 13 Drawing Sheets

OTHER PUBLICATIONS

3GPP TR 23.920 V3.1.0 (Oct. 1999), 3rd Generation Partnership Project; Technical Specification Group Services And Systems Aspects; Evolution of the GSM Platform Towards UMTS (3G TR23.920 version 3.1.0).

3GPP TR23.882 V1.2.3 (Jun. 2006), 3rd Generation Partnership Project; Technical Specification Group Services and System Aspects; 3GPP System Architecture Evolution: Report on Technical Options and Conclusions (Release 7).

3GPP TS 23.060 V6.9.0 (Jun. 2005), 3rd Generation Partnership Project; Technical Specification Group Services and System Aspects; General Packet Radio Service (GPRS); Service Description; Stage 2 (Release 6).

3GPP, "3rd Generation Partnership Project; Technical Specification Group Services and System Aspects; General Packet Radio Service (GPRS); Service Description; Stage 2 (Release 1999)," 3GPP TS 23.060 V3.16.0, (Dec. 2003).

3GPP, "3rd Generation Partnership Project; Technical Specification Group Services and System Aspects; General Packet Radio Service (GPRS); Service Description; Stage 2 (Release 4)," 3GPP TS 23.060 V4.10.0, (Sep. 2005).

3GPP, "3rd Generation Partnership Project; Technical Specification Group Services and System Aspects; General Packet Radio Service (GPRS); Service Description; Stage 2 (Release 5)," 3GPP TS 23.060 V5.10.0, (Mar. 2005).

3GPP, "3rd Generation Partnership Project; Technical Specification Group Services and System Aspects; General Packet Radio Service (GPRS); Service Description; Stage 2 (Release 5)," 3GPP TS 23.060 V5.12.0, (Dec. 2005).

3GPP, "3rd Generation Partnership Project; Technical Specification Group Core Network; Mobile Radio Interface Layer 3 Specification; Core Network Protocols; Stage 3 (Release 1999)," 3GPP TS 24.008 V3.19.0, (Jun. 2004).

3GPP, "3rd Generation Partnership Project; Technical Specification Group Core Network; Mobile Radio Interface Layer 3 Specification; Core Network Protocols; Stage 3 (Release 1999)," 3GPP TS 24.008 V3.20.0, (Dec. 2005).

3GPP, "3rd Generation Partnership Project; Technical Specification Group Core Network; Mobile Radio Interface Layer 3 Specification; Core Network Protocols; Stage 3 (Release 4)," 3GPP TS 24.008 V4.15.0, (Jun. 2005).

3GPP, "3rd Generation Partnership Project; Technical Specification Group Core Network; Mobile Radio Interface Layer 3 Specification; Core Network Protocols; Stage 3 (Release 4)," 3GPP TS 24.008 V4.16.0, (Dec. 2005).

3GPP, "3rd Generation Partnership Project; Technical Specification Group Core Network; Mobile Radio Interface Layer 3 Specification; Core Network Protocols; Stage 3 (Release 5)," 3GPP TS 24.008 V5.13.0, (Jun. 2005).

3GPP, "3rd Generation Partnership Project; Technical Specification Group Core Network; Mobile Radio Interface Layer 3 Specification; Core Network Protocols; Stage 3 (Release 5)," 3GPP TS 24.008 V5.16.0, (Jun. 2006).

3GPP, "3rd Generation Partnership Project; Technical Specification Group Core Network; Mobile Radio Interface Layer 3 Specification; Core Network Protocols; Stage 3 (Release 6)," 3GPP TS 24.008 V6.9.0, (Jun. 2005).

3GPP, "3rd Generation Partnership Project; Technical Specification Group Core Network; Mobile Radio Interface Layer 3 Specification; Core Network Protocols; Stage 3 (Release 6)," 3GPP TS 24.008 V6.13.0, (Jun. 2006).

3GPP, "3rd Generation Partnership Project; Technical Specification Group Core Network; Mobile Radio Interface Layer 3 Specification; Core Network Protocols; Stage 3 (Release 7)," 3GPP TS 24.008 V7.0.0, (Jun. 2005).

3GPP, "3rd Generation Partnership Project; Technical Specification Group Core Network; Mobile Radio Interface Layer 3 Specification; Core Network Protocols; Stage 3 (Release 7)," 3GPP TS 24.008 V7.4.0, (Jun. 2006).

IEEE, "IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation and Licensed Bands and Corrigendum 1," IEEE Std. 802.16e-2005, (Feb. 28, 2006).

Digital Cellular Telecommunications System (Phase 2+); Universal Mobile Telecommunications System (UMTS); Mobile Radio Interface Layer 3 Specification; Core Network Protocols; Stage 3, (3GPP TS 24.008 Version 6.9.0 Release 6), ETSI TS 124 008 V6.9.0 (Jun. 2005).

3GPP TR 23.920 V3.1.0 (Oct. 1999), 3rd Generation Partnership Project; Technical Specification Group Services And Systems Aspects; Evolution off the GSM Platform Towards UMTS (3G TR23.920 version 3.1.0).

3GPP TR23.882 V1.2.3 (Jun. 2006), 3rd Generation Partnership Project; Technical Specification Group Services and System Aspects; 3GPP System Architecture Evolution: Report on Technical Options and Conclusions (Release 7).

3GPP, "3rd Generation Partnership Project; Technical Specification Group Services and System Aspects; General Packet Radio Service (GPRS); Service Description; Stage 2 (Release 6)," 3GPP TS 23.060 V6.9.0, (Jun. 2005).

3GPP, "3rd Generation Partnership Project; Technical Specification Group Services and System Aspects; General Packet Radio Service (GPRS); Service Description; Stage 2 (Release 1999)," 3GPP TS 23.060 V3.17.0, (Dec. 2006).

3GPP, "3rd Generation Partnership Project; Technical Specification Group Services and System Aspects; General Packet Radio Service (GPRS); Service Description; Stage 2 (Release 4)," 3GPP TS 23.060 V4.9.0, (Dec. 2003).

3GPP, "3rd Generation Partnership Project; Technical Specification Group Services and System Aspects; General Packet Radio Service (GPRS); Service Description; Stage 2 (Release 7)," 3GPP TS 23.060 V7.1.0, (Jun. 2006).

3GPP, "3rd Generation Partnership Project; Technical Specification Group Core Network; Mobile Radio Interface Layer 3 Specification; Core Network Protocols; Stage 3 (Release 1999)," 3GPP TS 24.008 V3.19.0, (Jun. 2004).

3GPP, "3rd Generation Partnership Project; Technical Specification Group Core Network; Mobile Radio Interface Layer 3 Specification; Core Network Protocols; Stage 3 (Release 1999)," 3GPP TS 24.008 V3.20.0, (Dec. 2005).

3GPP, "3rd Generation Partnership Project; Technical Specification Group Core Network; Mobile Radio Interface Layer 3 Specification; Core Network Protocols; Stage 3 (Release 4)," 3GPP TS 24.008 V4.15.0, (Jun. 2005).

3GPP, "3rd Generation Partnership Project; Technical Specification Group Core Network; Mobile Radio Interface Layer 3 Specification; Core Network Protocols; Stage 3 (Release 4)," 3GPP TS 24.008 V4.16.0, (Dec. 2005).

Feng et al., "WGSN: WLAN-based GPRS Support Node with Push Mechanism," The Computer Journal, vol. 47, No. 4 (2004).

Belloni et al., "Inter-operator IP QOS Framework—ToIP and UMTS Case Studies," Eurescom (Jan. 2002).

Lin et al., "Mobility Management: from GRPS to UMTS," Wireless Communications and Mobile Computing, vol. 1, Issue 4, pp. 339-359 (Aug. 9, 2001).

Ransbottom, "Mobile Wireless System Interworking with 3G and Packet Aggregation for Wireless LAN," pp. 28-31, 49-52, 88-94 (Apr. 22, 2004).

* cited by examiner

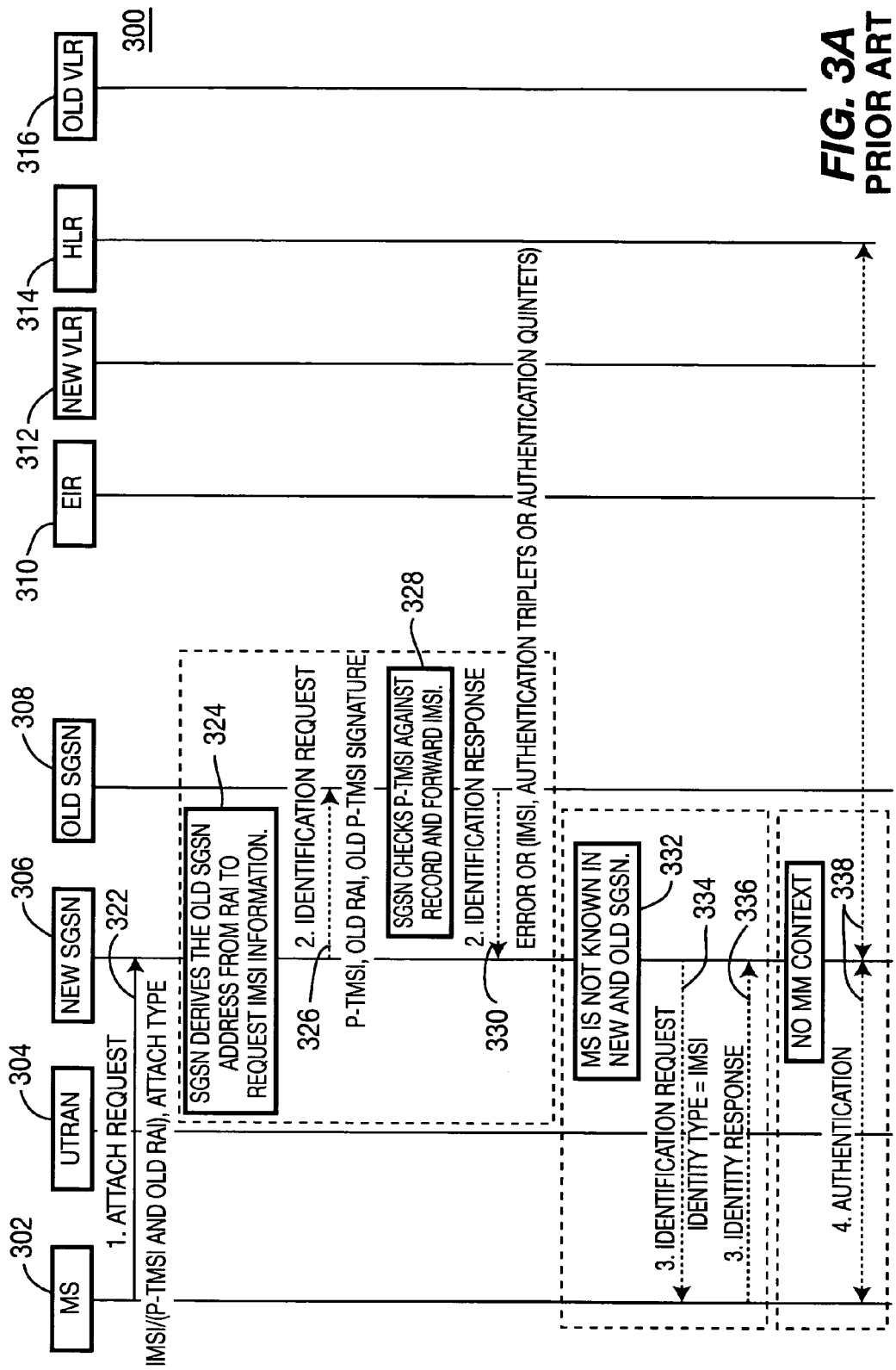

US 8,072,948 B2

WIRELESS COMMUNICATION SYSTEM AND METHOD OF IMPLEMENTING AN EVOLVED SYSTEM ATTACHMENT PROCEDURE

CROSS REFERENCE TO RELATED APPLICATION

This application claims the benefit of U.S. provisional application No. 60/699,304 filed Jul. 14, 2005, which is incorporated by reference as if fully set forth.

FIELD OF INVENTION

The present invention generally relates to an evolved wireless communication system, (e.g., evolved universal mobile telecommunication system (UMTS) terrestrial radio access network (E-UTRAN)). More particularly, the present invention is related to a wireless communication system and method of implementing evolved system attachment procedure.

BACKGROUND

Evolution of a third generation (3G) system is in progress to provide a higher data rate, lower latency, and support of multiple radio access technologies (RATs). The main features of the evolved 3G system include an enhanced air interface to handle higher data rates with more efficiency, optimization of conventional procedures to reduce the number of signaling procedures and reduce setup delay, and network design to permit interconnection and interoperation of any air interface, such as global standards for mobile communication (GSM), general packet radio services (GPRS), wideband code division multiple access (WCDMA), CDMA2000, IEEE 802.xx, or the like.

FIG. 1 shows a conventional GPRS access interface and reference points. A mobile station (MS) 102, which includes a terminal equipment (TE) 104 and a mobile terminal (MT) 106, is attached to one of a plurality of GPRS packet domain networks 108a, 108b, which is further connected to a packet data network 110. The GPRS packet domain networks 108a, 108b perform a network access control function, a packet routing and transfer function, a mobility management function, a logical link management function, a radio resource management function, a network management function, or the like.

The network access control function includes registration, authentication and authorisation, admission control, message screening, packet formats adaptation, charging data collection, operator determined barring, or the like. The packet routing and transfer function includes relay, routing, address translation and mapping, encapsulation, tunnelling, compression, ciphering, domain name server, or the like. The logical link management function includes establishment, maintenance and release of a session.

FIGS. 2A and 2B show conventional state machines for mobility management (MM) of an MS and a serving GRPS support node (SGSN) in an Iu mode. The MS and the SGSN may be in one of a packet mobility management (PMM)-detached state, a PMM-connected state and a PMM-idle state. In the PMM-detached state, there is no communication between the MS and the SGSN. In order to establish MM contexts in the MS and the SGSN, the MS performs a GPRS attach procedure. Upon GPRS attach, the state changes to the PMM-connected state, and a packet switching (PS) signaling connection is established between the MS and the SGSN. A PS signaling connection release changes the state to the PMM-idle state. GPRS detach, PS attach reject or routing area update (RAU) reject causes the state to change to the PMM-detached state. In the PMM-idle and PMM-connected state, the session management (SM) state may be active or inactive.

FIGS. 3A, 3B and 3C, taken together, are a signaling diagram of an attach procedure 300 in a conventional GPRS system. As shown in FIG. 3A, an MS 302 initiates the attach procedure 300 by the transmission of an attach request message to a new SGSN 306 (step 322). The attach request message includes an international mobile subscriber identity (IMSI) (alternatively, a packet-temporary mobile subscriber identity (P-TMSI) and an old routing area identity (RAI)), an attach type, or the like.

If the MS 302 identifies itself with the P-TMSI, the new SGSN 306 derives an old SGSN address from the RAI to request IMSI information of the MS 302 (step 324). The new SGSN 306 sends an identification request message to an old SGSN 308 (step 326). The identification request message includes a P-TMSI, an old RAI, old P-TMSI signature, or the like. The old SGSN 308 checks the P-TMSI against record and sends an identification response message with the IMSI of the MS 302 to the new SGSN 306 (steps 328, 330). If the MS 302 is known in the old SGSN 308, the old SGSN 308 responds with an identification response message including the IMSI, authentication triplets or authentication quintets. If the MS 302 is not known in the old SGSN 308 or the old P-TMSI does not match the value stored in the old SGSN 308, the old SGSN 308 responds with an appropriate error cause in the identification response message at step 330.

If the MS 302 is unknown in the old SGSN 308, the new SGSN 306 sends an identity (ID) request (ID Type=IMSI) to the MS 302 (step 334). The MS 302 responds with an ID response including the IMSI of the MS 302 (step 336).

If no MM context for the MS exists anywhere in the network, an authentication procedure is performed by the MS 302, the new SGSN 306 and a home location register (HLR) 314 (step 338).

Referring to FIG. 3B, based on operator configuration, an international mobile equipment identity (IMEI) checking procedure may optionally be performed by the MS 302, the new SGSN 306 and an equipment identity register (EIR) 310 (step 340). If the SGSN number has changed since the last GPRS detach, or if it is the very first attach, the new SGSN 306 updates the HLR 314 by sending an update location message to the HLR 314 (step 342). The update location message includes an SGSN number, an SGSN address, the IMSI, or the like.

The HLR 316 compares the SGSN number with records and sends a cancel location message (including IMSI, cancellation type) to the old SGSN 308 (steps 344, 346). The old SGSN 308 acknowledges with a cancel location acknowledgement (ACK) (step 348). The HLR 314 sends an insert subscriber data message including the IMSI and GPRS subscription data to the new SGSN 306 (step 350).

The new SGSN 306 checks if the MS 302 is not allowed in the new routing area (RA) (step 352). If due to regional subscription restrictions or access restrictions the MS 302 is not allowed to attach in the RA, the new SGSN 306 rejects the attach request with an appropriate cause, and may return an insert subscriber data ACK (including the IMSI, an SGSN area restricted message) to the HLR 314 (steps 354). If the subscription checking fails for other reasons, the new SGSN 306 also rejects the attach request with an appropriate cause and returns an insert subscriber data ACK (including the IMSI and a cause) to the HLR 314. If all checks are successful, the new SGSN 306 constructs an MM context for the MS 302 and returns an insert subscriber data ACK (including the IMSI) to the HLR 314 (steps 356, 358). The HLR 314 updates the MM context and sends an update location ACK to the new SGSN 306 (steps 360, 362).

Referring to FIG. 3C, if the attach type indicated in the attach request indicates a combined GPRS/IMSI attach, a visitor location register (VLR) should be updated. The new SGSN 306 sends a location update request to a new VLR 312 (step 364). The location update request includes a new LAI, the IMSI, an SGSN number, a location update type, or the like.

The new VLR 312 creates an association with the new SGSN 306 by storing the SGSN number. If the location area (LA) update is inter-mobile switching center (MSC), the new VLR 312 sends an update location message (including the IMSI and a new VLR) to the HLR 314 (step 366). The HLR 314 sends a cancel location message to an old VLR 316 (step 368). The old VLR 316 acknowledges with a cancel location ACK (step 370).

The HLR 314 sends an insert subscriber data message (including the IMSI and subscriber data) to the new VLR 312 (step 372). The new VLR 312 acknowledges with an insert subscriber data ACK (step 374). After finishing the inter-MSC location update procedures, the HLR 314 responds with an update location ACK to the new VLR 312 (step 376). The new VLR 312 responds with a location update accept message (including VLR TMSI) to the new SGSN 306 (step 378).

The new SGSN 306 sends an attach accept message to the MS 302 (step 380). The attach accept message includes a P-TMSI, a VLR TMSI, P-TMSI signature, and radio priority SMS. The MS 302 then returns an attach complete message to the new SGSN 306 and the new SGSN 306 sends a TMSI reallocation complete message to the new VLR 312 (steps 382, 384).

FIG. 4 is a diagram of a conventional state machine for SM. A GPRS subscription contains the subscription of one or more packet data protocol (PDP) addresses. Each PDP address is an element of a PDP context. The PDP state indicates whether data transfer is enabled for that PDP address or not. The PDP state is moved from an inactive state to an active state when PDP context is activated. The active state is changed to the inactive state when the deactivation procedure is initiated, or when the MM state changes to the PMM-idle state or PMM-detached state.

In the inactive state, the data service for a certain PDP address of the MS is not activated and the PDP context contains no routing or mapping information to process PDP protocol data units (PDUs) related to that PDP address. In the active state, the PDP context for the PDP address in use is activated in the MS, SGSN and gateway GPRS support node (GGSN). The PDP context contains mapping and routing information for transferring PDP PDUs for that particular PDP address between the MS and the GGSN. The active state is permitted only when the MM state of the MS is PMM-idle state or PMM-connected state.

FIG. 5 is a flow diagram of a conventional PDP context activation procedure 500. The MS 302 sends an activate PDP context request message to an SGSN 306 (step 502). The activate PDP context request message includes a PDP type, a PDP address, an access point name (APN), quality of service (QoS) requested, protocol configuration options, or the like. The SGSN 306 validates the activate PDP context request, selects an APN and maps the APN to a GGSN 310 (step 504).

The SGSN 306 sends a create PDP context request message to the GGSN 310 (step 506). The create PDP contest request message includes a PDP type, a PDP address, an APN, QoS negotiated, a TEID, charging characteristics, or the like. The GGSN 310 creates a new entry in its PDP context table and returns a create PDP context response to the SGSN 306 (step 508). The create PDP context response message includes a TEID, a PDP address, protocol configuration options, QoS negotiated, charging ID, or the like.

Radio access bearer (RAB) setup is performed among the MS 302, the RAN 304 and the SGSN 306 (step 510). In Iu mode and if basic service set (BSS) trace is activated, the SGSN 306 may send an invoke trace message to the RAN 304 (step 512). The SGSN 306 may inform the GGSN 310 about the downgraded QoS attributes by sending an update PDP context request (step 514). The GGSN 310 confirms the new QoS attributes by sending an update PDP context response to the SGSN 306 (step 516).

The SGSN 306 inserts the GGSN address in its PDP context (step 518). If the MS 302 has requested a dynamic address, the PDP address received from the GGSN 310 is inserted in the PDP context. The SGSN 306 selects radio priority and packet flow ID based on QoS negotiated, and returns an activate PDP context accept message to the MS 302 (step 520). The activate PDP context accept message includes a PDP type, a PDP address, a transaction identifier (TI), QoS negotiated, radio priority, a packet flow ID, protocol configuration options, or the like. If the MS 302 indicated in the MS network capability it does not support BSS packet flow procedures, the SGSN 306 then shall not include the packet flow ID.

SUMMARY

The present invention is related to a wireless communication system and method of implementing an evolved system attachment procedure. The wireless communication system includes a first core network, (i.e., conventional third generation partnership project (3GPP) core network), and a second core network, (i.e., evolved core network), which is evolved from the first core network. An evolved wireless transmit/receive unit (WTRU) operating in the evolved system upon power up, sends a modified Attach Request message to the evolved core network. Upon reception, the evolved core network performs the same procedures specified in 3GPP TS23.060 PS attach procedure, (e.g., Authentication, Authorization, Mobility Management, or the like). The evolved core network then proceeds to activate the PDP context (allocation and configuration of default IP address for the WTRU). Upon successful completion of IP configuration procedures (PDP context activation), the evolved core network sends the new Attach Accept message to the WTRU. The new Attach Accept message includes information regarding the PDP context (e.g., IP address, IP version (i.e., v4 or v6), APN information, QoS, or the like). The evolved core network also constructs a session (SM) and mobility management (MM) (SMM) context for SM and MM for the WTRU. The SM and MM states in accordance with the present invention are different from conventional 3GPP-based MM and SM states (in the first core network). The SM and MM in accordance with the present invention adopts the allocation of the IP address for the entire operation of the WTRU. If the WTRU is connected, then the IP address is allocated. If no IP address is allocated then the WTRU is in a De-Attached state, (i.e., not reachable or OFF). In accordance with the present invention, the WTRU state (availability) depends on the allocation of IP address. The state transition between MM states are changed accordingly.

BRIEF DESCRIPTION OF THE DRAWINGS

FIGS. 3A-3C, taken together, are a flow diagram of a conventional PS-attach and registration procedure.

DETAILED DESCRIPTION OF THE PREFERRED EMBODIMENTS

When referred to hereafter, the terminology "WTRU" includes but is not limited to a user equipment (UE), an MS, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

Figure 1:
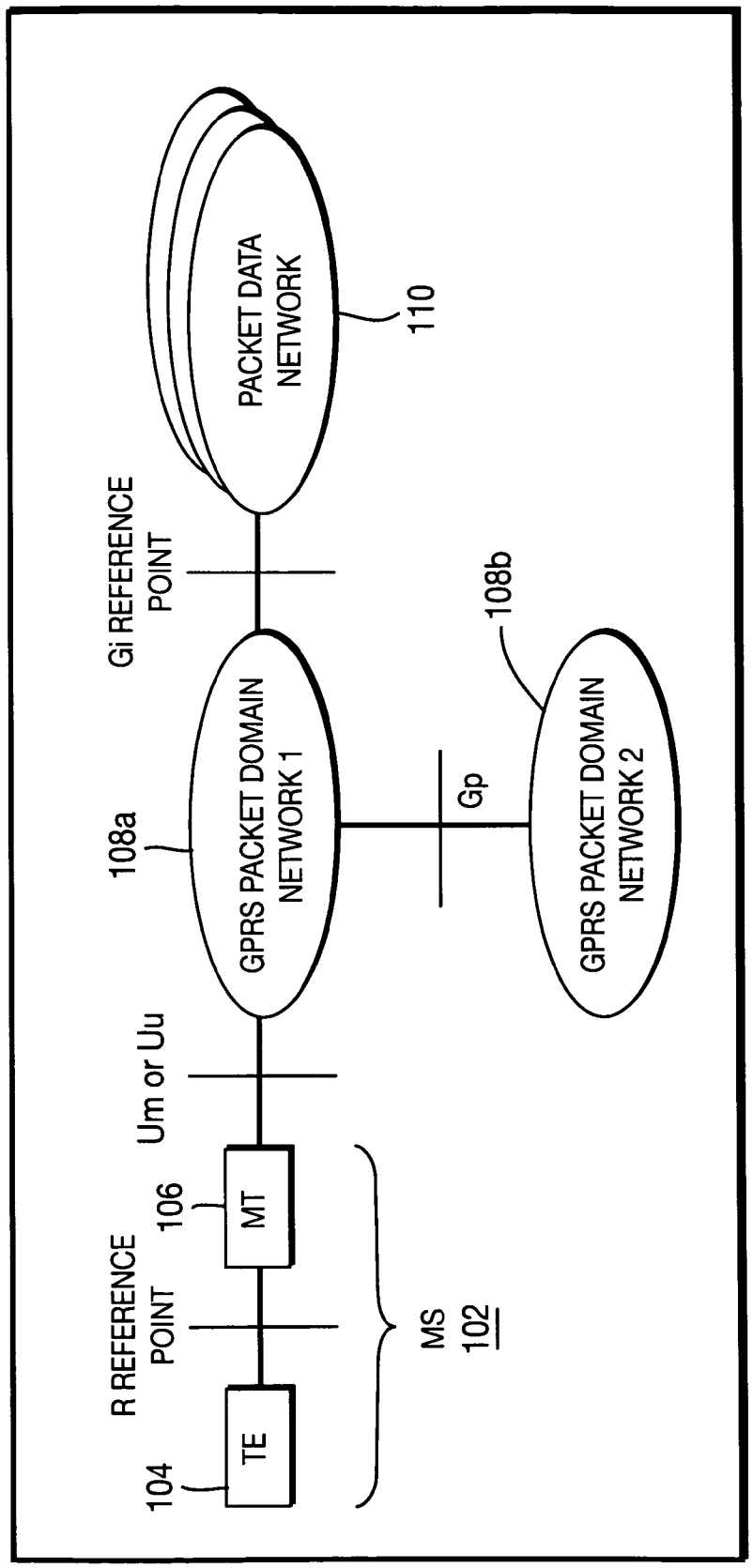
FIG. 1 is a diagram of conventional GPRS access interfaces and reference points.
Figure 2B:
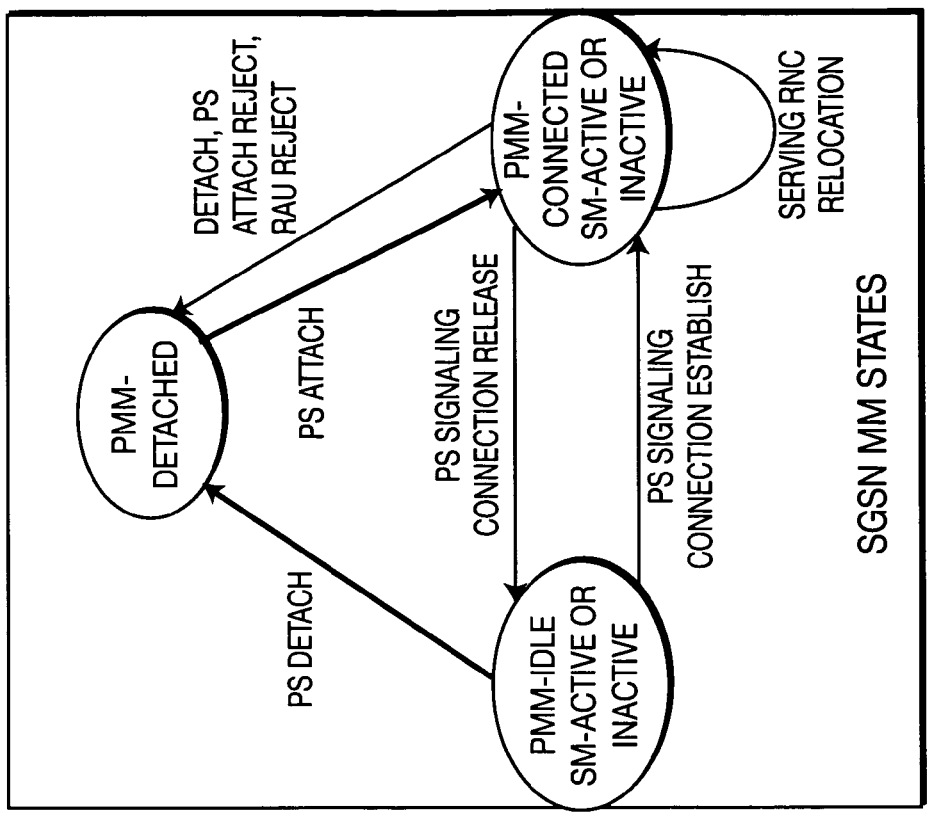
FIGS. 2A and 2B show conventional state machines for mobility management.
Figure 2A:
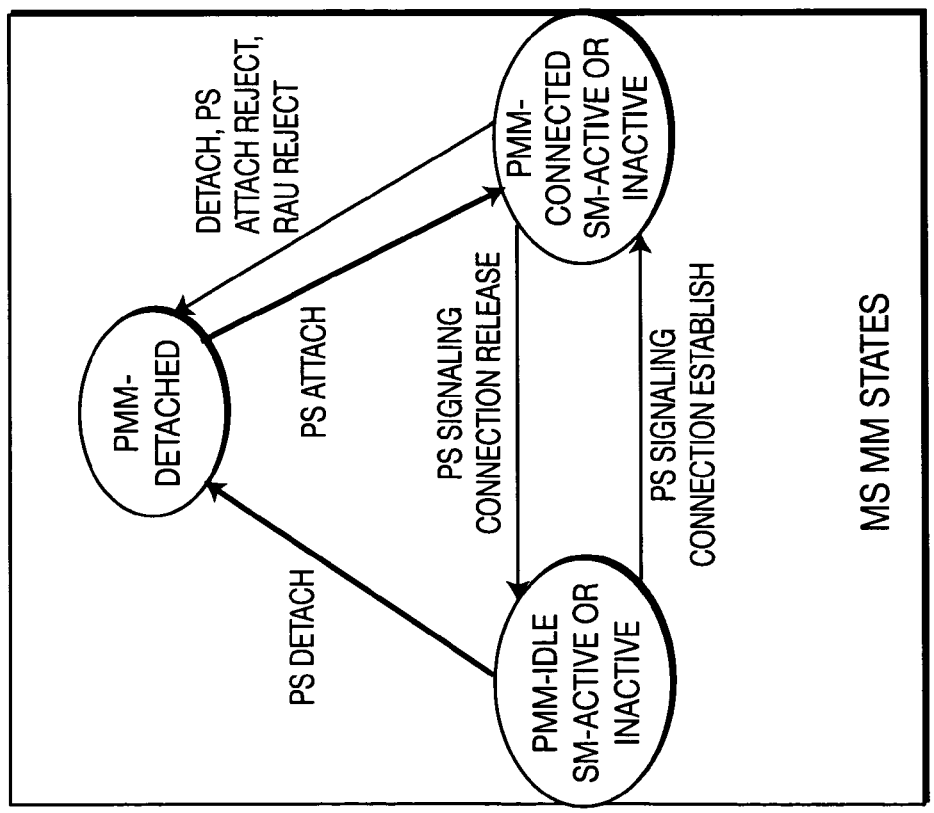
Figure 3B:
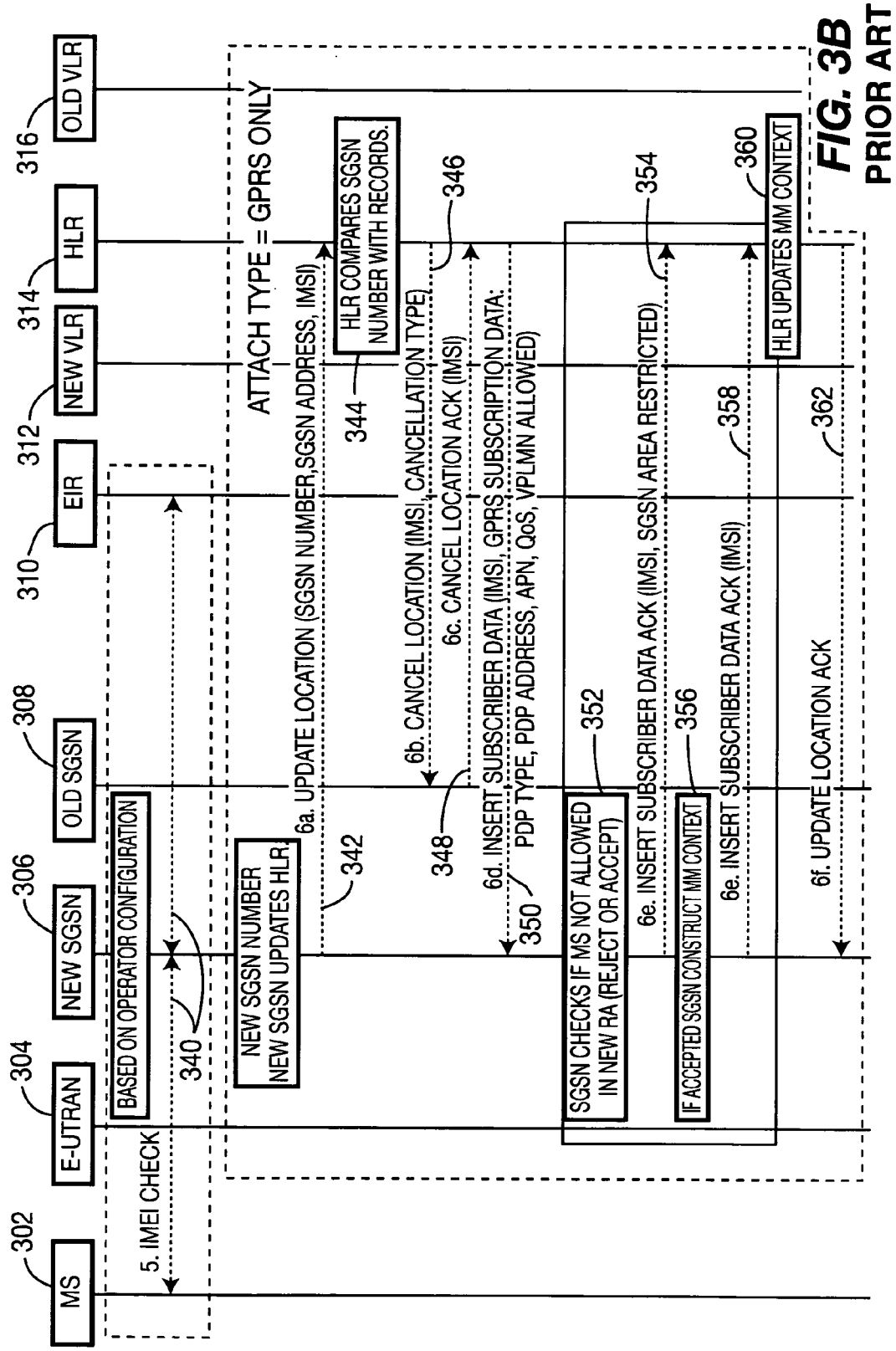
Figure 3C:
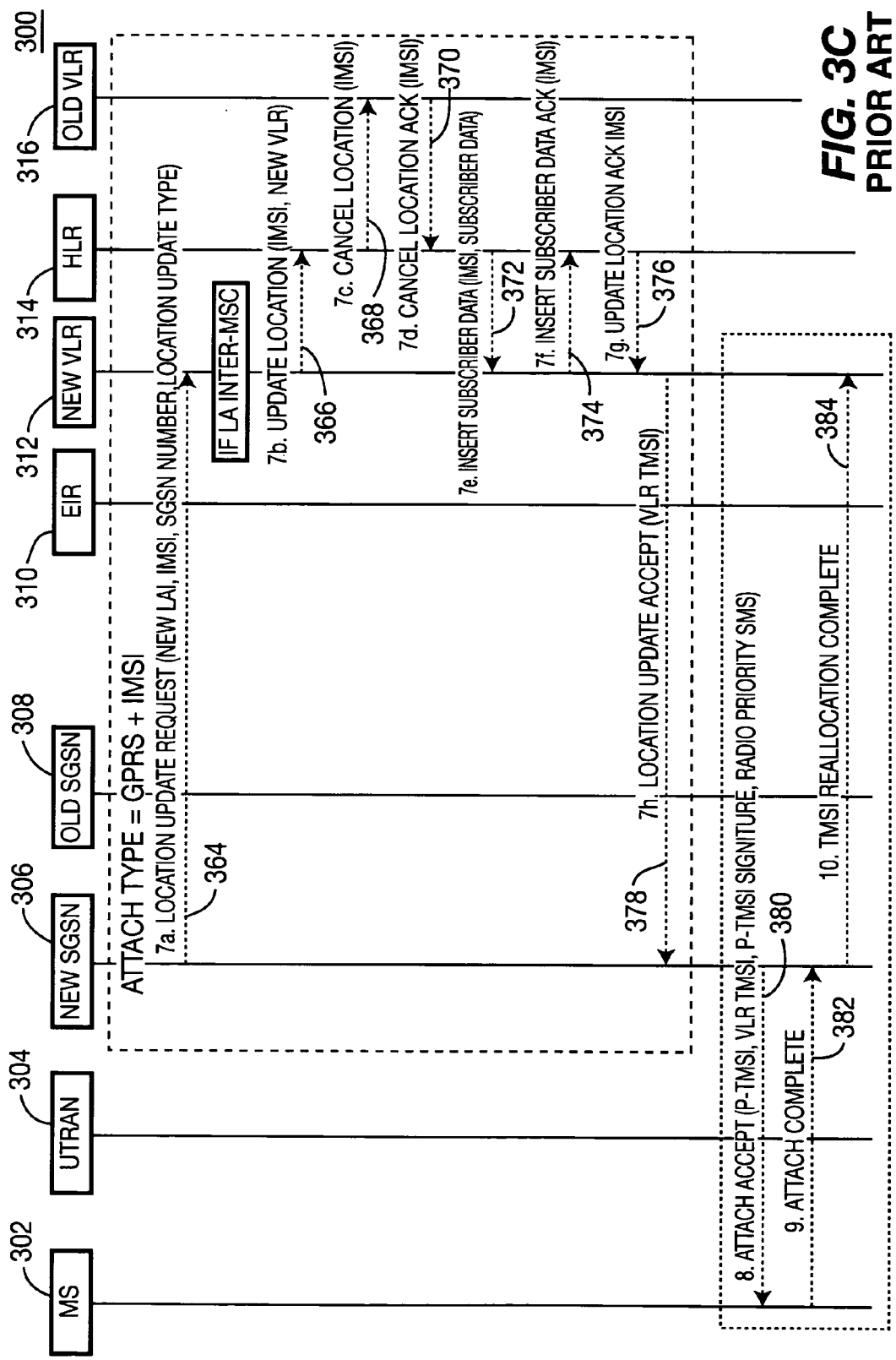
Figure 4:
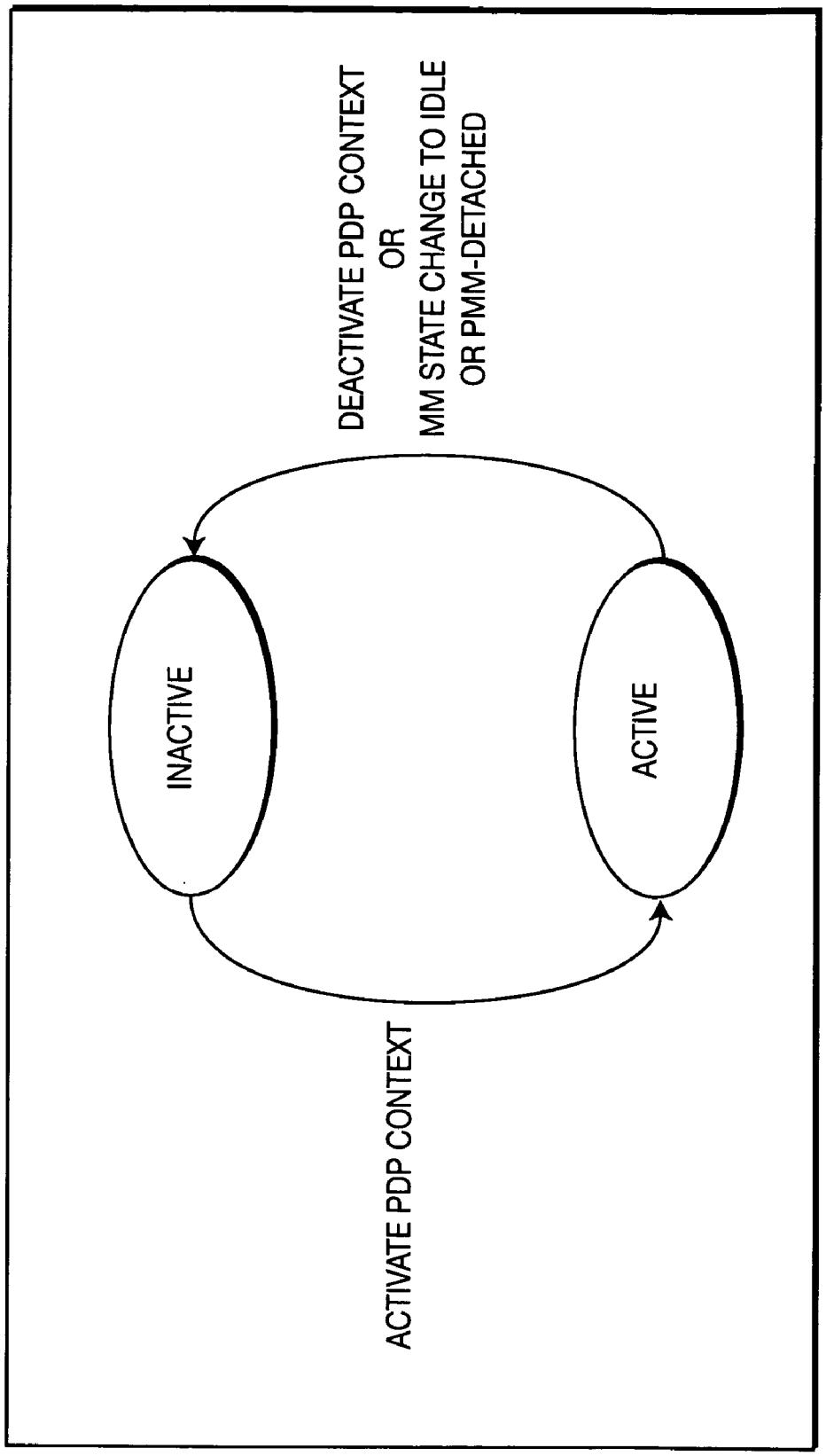
FIG. 4 is a diagram of a conventional state machine for session management.
Figure 5:
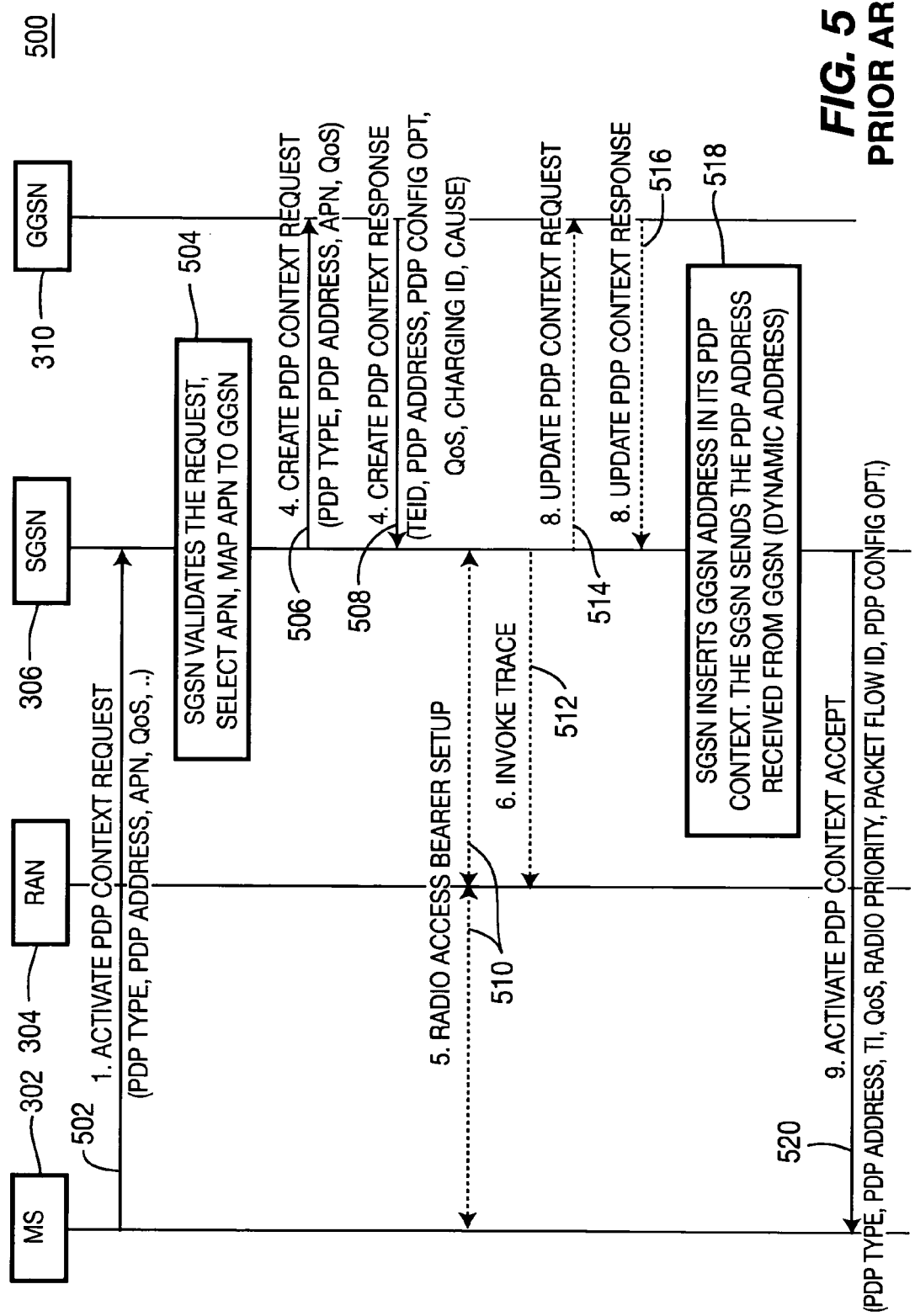
FIG. 5 is a flow diagram of a conventional PDP Context activation procedure.
Figure 6:
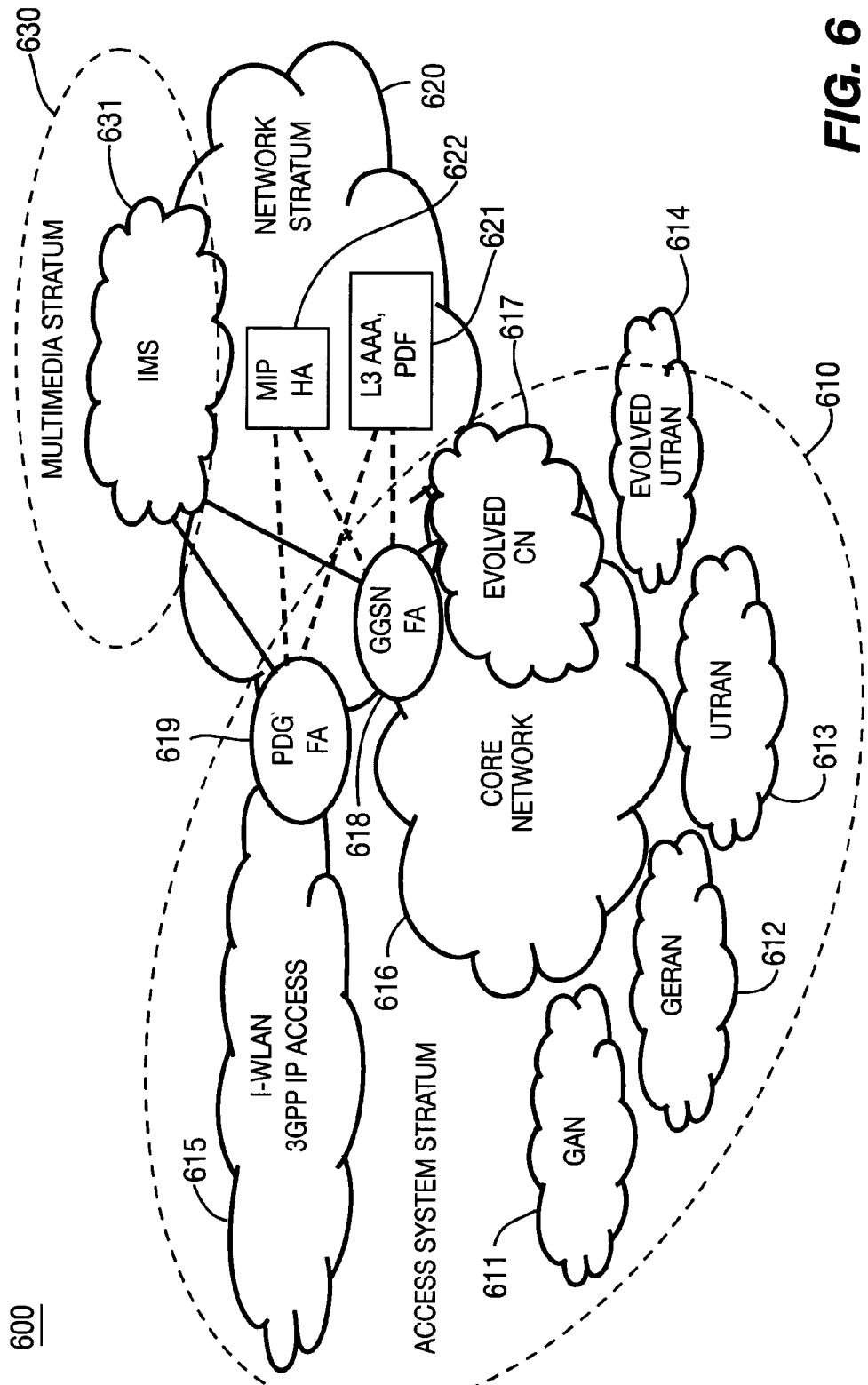
FIG. 6 is a diagram of an exemplary evolved system architecture including E-UTRAN and an evolved core network (CN) in accordance with the present invention.

FIG. 6 is a diagram of an exemplary evolved system 600 including an E-UTRAN and an evolved CN in accordance with the present invention. The evolved system 600 includes an access system stratum 610, a network stratum 620 and a multimedia stratum 630. The access system stratum 610 includes a plurality of radio access networks (RANs), a CN 616 and an evolved CN 617. The RANs include a generic access network (GAN) 611, a GSM/EDGE radio access network (GERAN) 612, a UTRAN 613, an E-UTRAN 614 and an interworking wireless local area network (I-WLAN) 615. The RANs 611-615 are connected to the CN 616 or the evolved CN 617 to provide services, (such as multimedia services from an Internet protocol (IP) multimedia subsystem (IMS) 631), to one or more WTRUs while interacting with an authentication, authorization and accounting (AAA) server 621, a mobile IP (MIP) server 622, or other network entities in the network stratum 620 via a GGSN 618 or a packet data gateway (PDG) 619.

Figure 7:
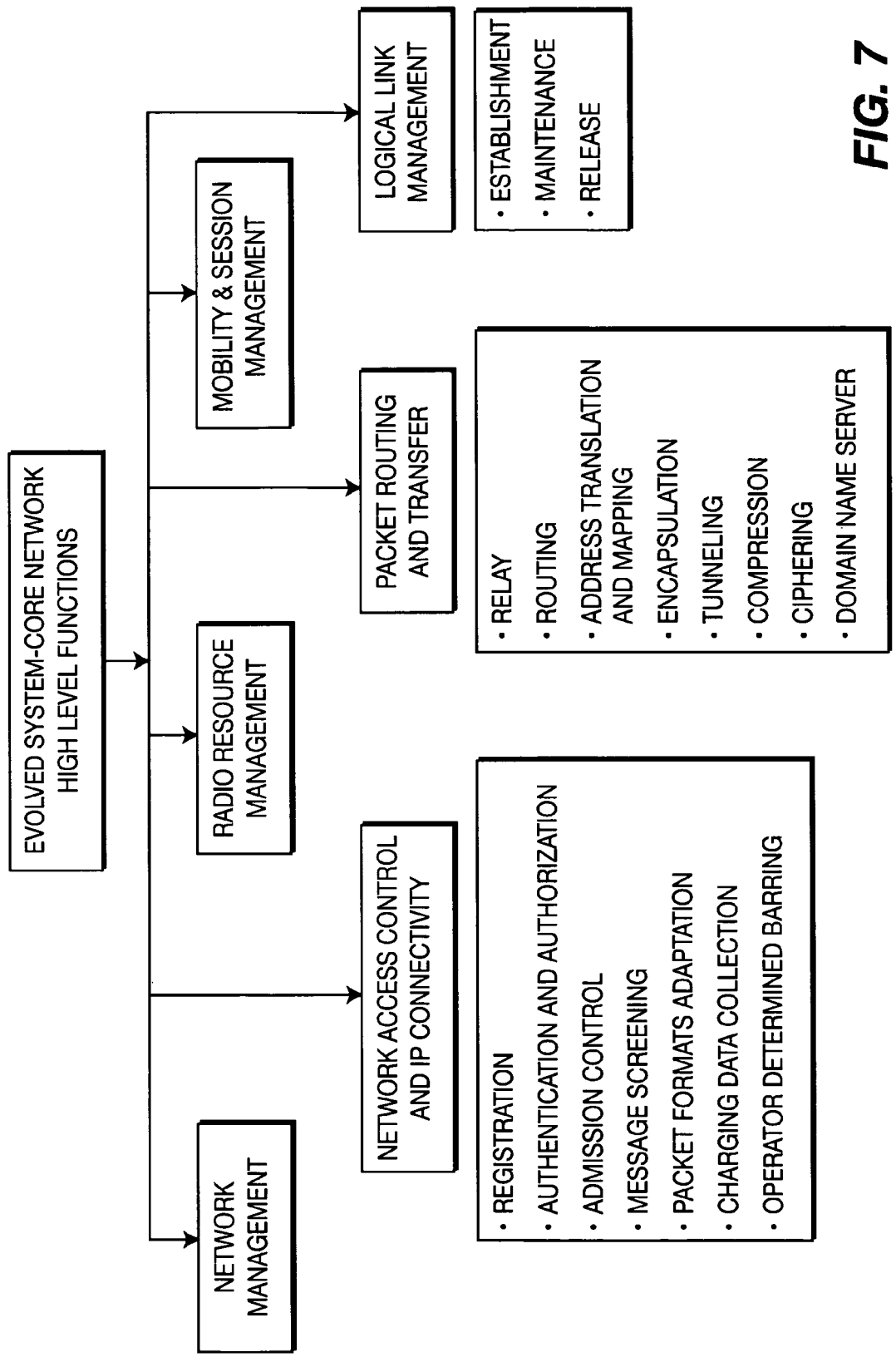
FIG. 7 is a diagram of evolved system core network high-level functions in accordance with the present invention.

FIG. 7 is a diagram of evolved system core network high-level functions in accordance with the present invention. The network access and IP connectivity control function controls registration, authentication and authorisation, admission, message screening, packet formats adaptation, charging data collection, operator determined barring, or the like. The packet routing and transfer function controls reay, routing, address translation and mapping, encapsulation, tunnelling, compression, ciphering, domain name server, or the like. The logical link management function controls establishment, maintenance and release of a session.

Figure 8B:
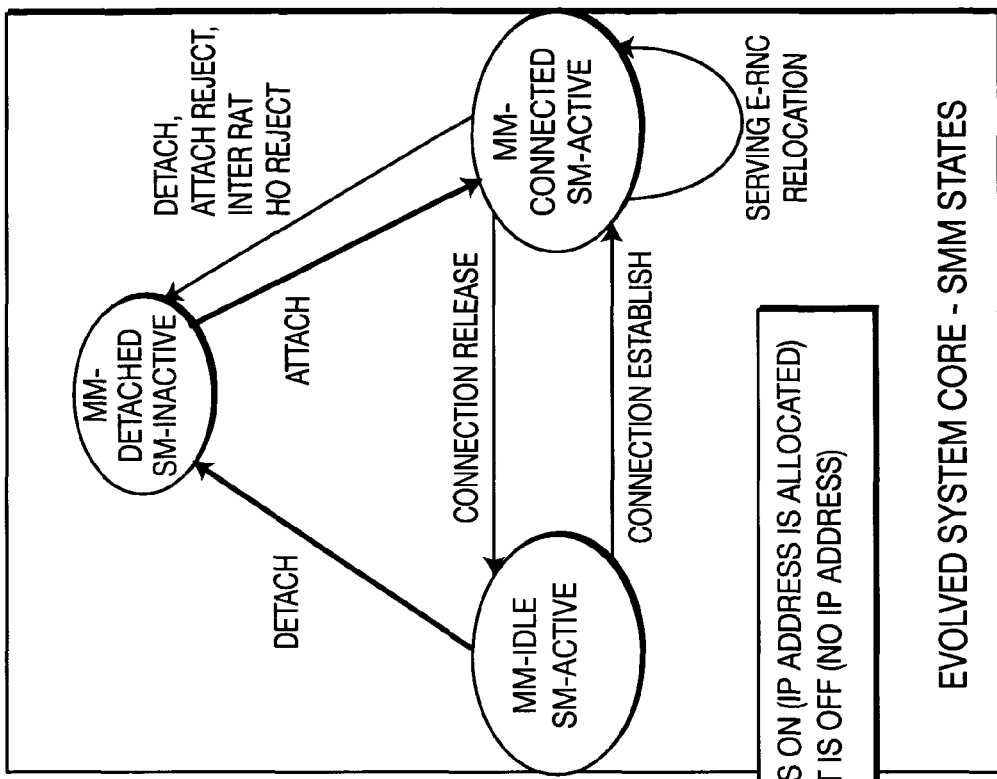
FIGS. 8A and 8B show state machines for session and mobility management (SMM) in accordance with the present invention.
Figure 8A:
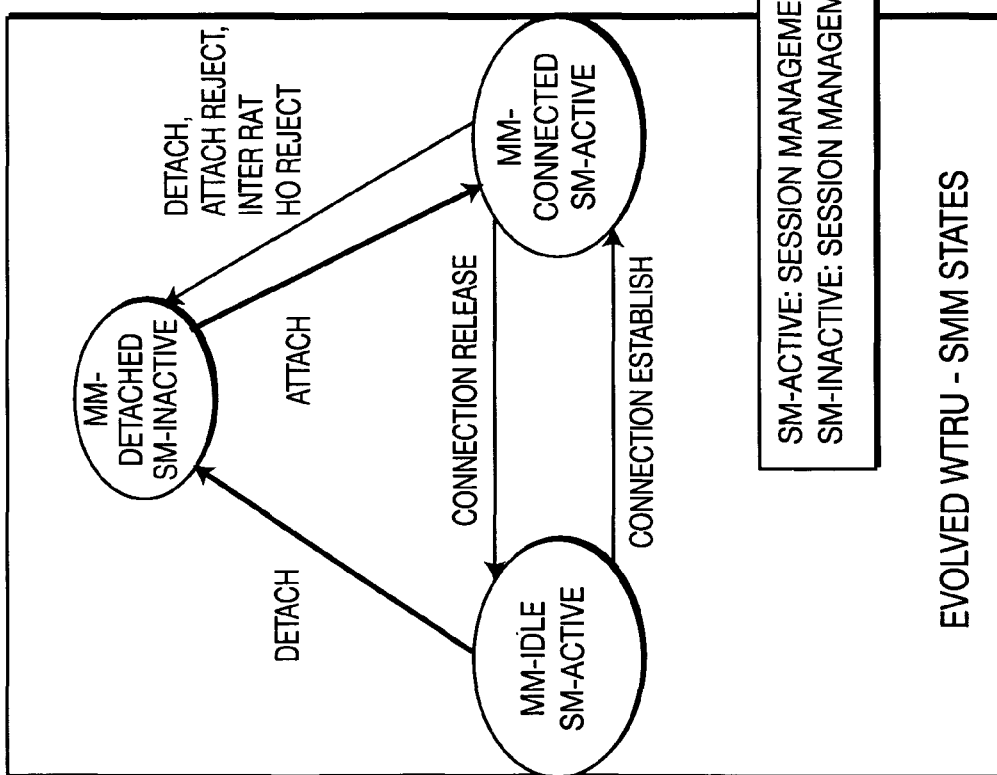

FIGS. 8A and 8B show state machines for session and mobility management (SMM) in accordance with the present invention. The WTRU and the evolved system core may be in one of an MM-detached and SM-inactive state, an MM-connected and SM-active state and an MM-idle and SM-active state. In the MM-detached and SM-inactive state, there is no communication between the WTRU and the evolved system core. After evolved system attachment, the SMM state changes from the MM-detached and SM-inactive state to the MM-connected and SM-active state. In the MM-connected and SM-active state, a PS signaling connection is established between the WTRU and the evolved system core. A PS signaling connection release while in the MM-connected and SM-active state changes the SMM state to the MM-idle and SM-active state. A PS signaling connection establishment while in the MM-idle and SM-active state changes the SMM state to the MM-connected SM-active state. Evolved system detach, PS attach reject or inter-RAT handover reject causes the SMM state to change to the MM-detached and SM-inactive state.

Figure 9A:
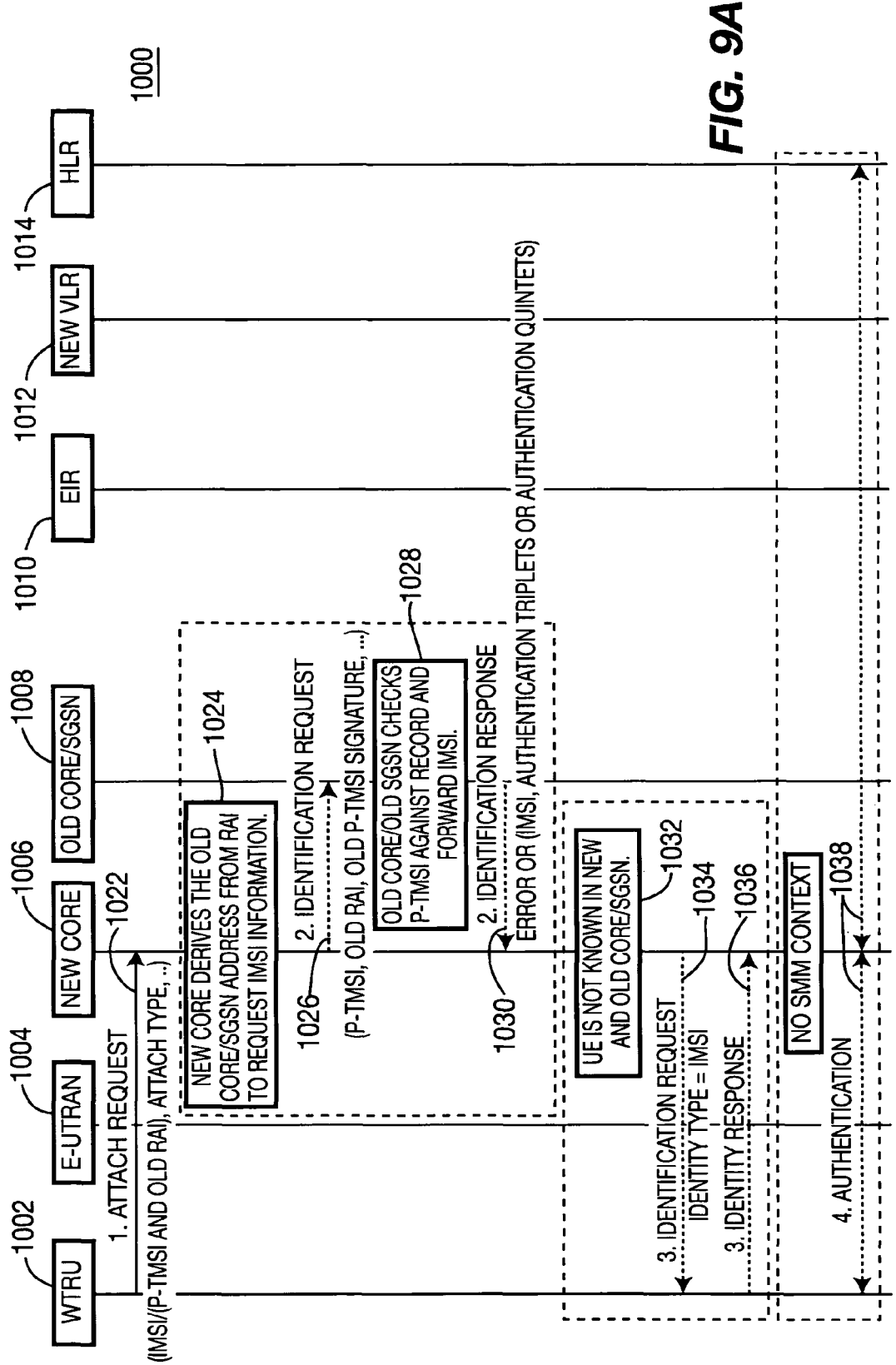
FIGS. 9A-9C, taken together, are a flow diagram of an evolved system attachment and registration procedure in accordance with the present invention.
Figure 9B:
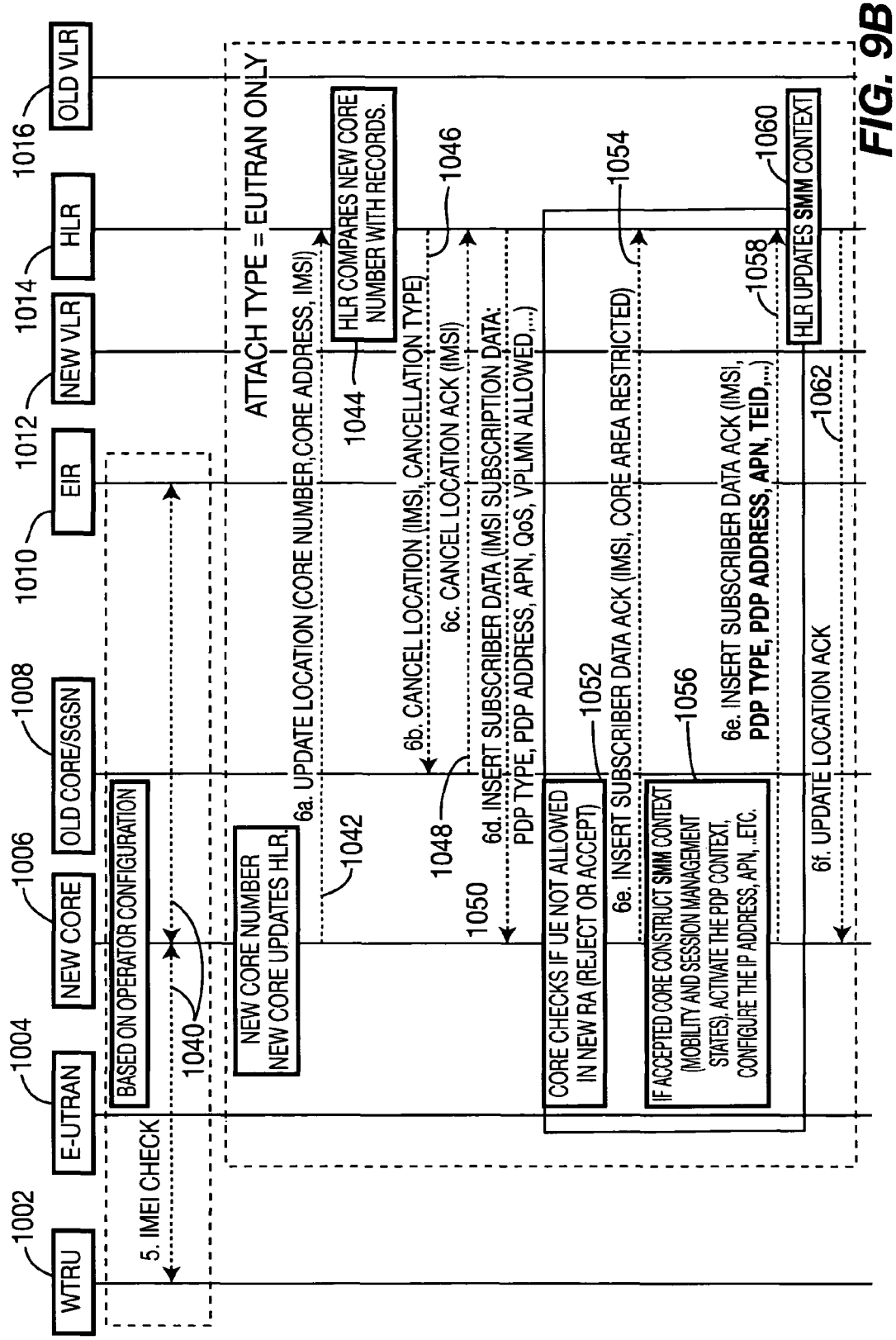
Figure 9C:
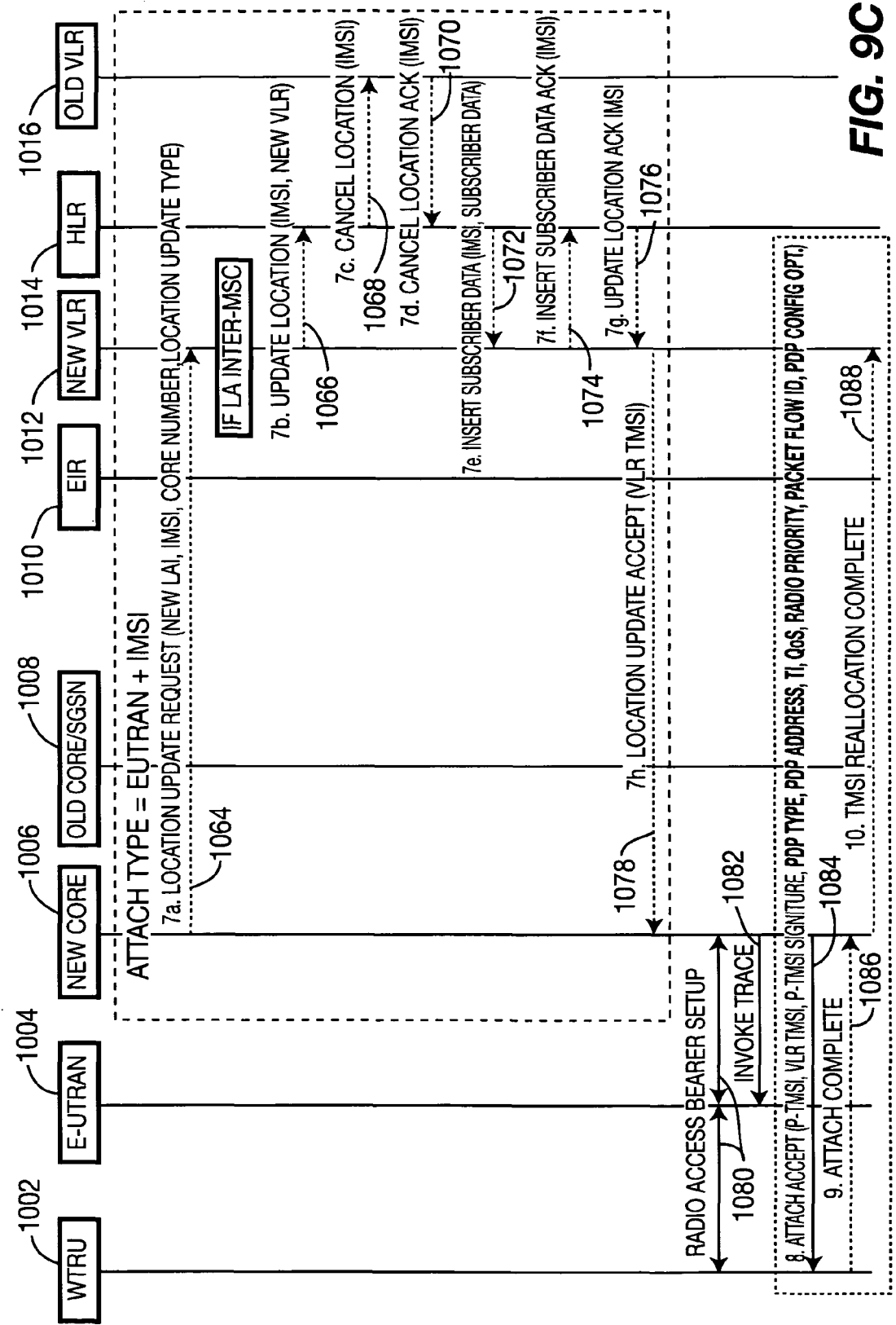

FIGS. 9A-9C are a flow diagram of a process 1000 for evolved system attachment and registration in accordance with the present invention. A WTRU 1002 initiates the attach procedure 1000 by the transmission of an attach request message to a new CN, (i.e., evolved CN), 1006 (step 1022). The attach request message includes an IMSI (or P-TMSI and an old RAI), an attach type, or the like. If the WTRU 1002 identifies itself with the P-TMSI, the new CN 1006 derives an old SGSN address from the RAI to request IMSI information of the WTRU 1002 (step 1024). The new CN 1006 sends an identification request message to the old SGSN 1008 (step 1026). The identification request message includes a P-TMSI, an old RAI, old P-TMSI signature, or the like.

The old SGSN 1008 checks the P-TMSI against record and sends an identification response message the new CN 1006 (steps 1028, 1030). If the WTRU 1002 is known in the old SGSN 1008, the old SGSN 1008 responds with the identification response message including the IMSI, authentication triplets or authentication quintets. If the WTRU 1002 is not known in the old SGSN 1008 or the old P-TMSI does not match the value stored in the old SGSN 1008, the old SGSN 1008 responds with an appropriate error cause in the identification response message at step 1030. If the WTRU 1002 is unknown in the old SGSN 1008, the new CN 1006 sends an ID request (ID Type=IMSI) to the WTRU 1002 (steps 1032, 1034). The WTRU 1002 then responds with an ID response including the IMSI of the WTRU 1002 (step 1036). [0048] If no MM context for the WTRU 1002 exists anywhere in the network, an authentication procedure is performed by the WTRU 1002, the new CN 1006 and an HLR 1014 (step 1038). Based on operator configuration, an IMEI checking procedure may optionally be performed by the WTRU 1002, the new CN 1006 and an EIR 1010 (step 1040).

If the new CN number has changed since the last system attach, or if it is the very first attach, the new CN 1006 updates the HLR 1014 by sending an update location message to the HLR 1014 (step 1042). The update location message includes a CN number, a CN address, the IMSI, or the like.

The HLR 1014 compares the CN number with records and sends a cancel location message (including the IMSI, a cancellation type) to the old SGSN 1008 (steps 1044, 1046). The old SGSN 1008 acknowledges with a cancel location ACK (step 1048). The HLR 1014 sends an insert subscriber data message, (including the IMSI, subscription data, a PDP type, a PDP address, an APN, QoS, visiting public land mobile network (VPLMN) allowed, or the like), to the new CN 1006 (step 1050).

The new CN 1006 checks if the WTRU 1002 is not allowed in the new RA (step 1052). If due to regional subscription restrictions or access restrictions the WTRU 1002 is not allowed to attach in the RA, the new CN 1006 rejects the attach request with an appropriate cause, and may return an insert subscriber data ACK (including the IMSI, CN area restricted message) to the HLR 1014 (steps 1054). If the subscription checking fails for other reasons, the new CN 1006 also rejects the attach request with an appropriate cause and returns an insert subscriber data ACK (including the IMSI and cause) to the HLR 1014. If all checks are successful, the new CN 1006 constructs an SMM context for the WTRU 1002, activates the PDP context (step 1056) and returns an insert subscriber data ACK (including the IMSI, a PDP type, a PDP address, an APN, a TEID, or the like) to the HLR 1014 (step 1058). The HLR 1014 updates the SMM context and sends an update location ACK to the new CN 1006 (steps 1060, 1062).

If the attach type indicated in the attach request indicates a combined E-UTRAN/IMSI attach, a VLR should be updated. The new CN 1006 sends a location update request to a new VLR 1012 (step 1064). The location update request includes a new LAI, the IMSI, a CN number, a location update type, or the like.

The new VLR 1012 creates an association with the new CN 1006 by storing the CN number. If the LA update is inter-mobile switching center (MSC), the new VLR 1012 sends an update location message (including the IMSI and a new VLR) to the HLR 1014 (step 1066). The HLR 1014 sends a cancel location message to an old VLR 1016 (step 1068). The old VLR 1016 acknowledges with a cancel location ACK (step 1070).

The HLR 1014 sends an insert subscriber data message (including the IMSI and subscriber data) to the new VLR 1012 (step 1072). The new VLR 1012 acknowledges with an insert subscriber data ACK (step 1074). After finishing the inter-MSC location update procedures, the HLR 1014 responds with an update location ACK to the new VLR 1012 (step 1076). The new VLR 1012 responds with a location update accept message (including VLR TMSI) to the new CN 1006 (step 1078).

An RAB setup procedure is performed among the WTRU 1002, the UTRAN 1004 and the new CN 1006 (step 1080). In Iu mode and if BSS trace is activated, the new CN 1006 may send an invoke trace message to the UTRAN 1004 (step 1082).

The new CN 1006 sends an attach accept message to the WTRU 1002 (step 1084). The attach accept message includes a P-TMSI, a VLR TMSI, P-TMSI signature, a PDP type, a PDP address, a TI, QoS, radio priority, a packet flow ID, PDP configuration, or the like. The attach accept message may also include an IP address. The WTRU 1002 then returns an attach complete message to the new CN 1006 and the new CN 1006 sends a TMSI reallocation complete message to the new VLR 1012 (steps 1086, 1088).

An example of the information elements (IEs) included in the attach accept message in accordance with the present invention are shown in Table 1. New IEs introduced in accordance with the present invention are shown in bold font in Table 1. The attach accept message is sent by the CN to the WTRU to indicate that the corresponding attach request has been accepted. As noted above, the attach accept message may also include an IP address.

TABLE 1

| IEI | Information Element | Type/Reference | Presence | Format | Length |
|---|---|---|---|---|---|
| | Protocol discriminator | Protocol discriminator | M | V | ½ |
| | Skip indicator | Skip indicator | M | V | ½ |
| | Attach accept message identity | Message type | M | V | 1 |
| | Attach result | Attach result | M | V | ½ |
| | Force to standby | Force to standby | M | V | ½ |
| | Periodic RA update timer | GPRS Timer | M | V | 1 |
| | Radio priority for SMS | Radio priority | M | V | ½ |
| | Radio priority for TOM8 | Radio priority 2 | M | V | ½ |
| | Routing area identification | Routing area identification | M | V | 6 |
| 19 | P-TMSI signature | P-TMSI signature | O | TV | 4 |
| 17 | Negotiated READY timer value | GPRS Timer | O | TV | 2 |
| 18 | Allocated P-TMSI | Mobile identity | O | TLV | 7 |
| 23 | MS identity | Mobile identity | O | TLV | 7-10 |
| 25 | GMM cause | GMM cause | O | TV | 2 |
| 2A | T3302 value | GPRS Timer 2 | O | TLV | 3 |
| 8C | Cell Notification | Cell Notification | O | T | 1 |
| 4A | Equivalent PLMNs | PLMN List | O | TLV | 5-47 |
| B- | Network feature support | Network feature support | O | TV | 1 |
| 34 | Emergency Number List | Emergency Number List | O | TLV | 5-50 |
| A- | Requested MS Information | Requested MS Information | O | TV | 1 |
| | Negotiated LLC SAPI | LLC service access point identifier | M | V | 1 |
| | Negotiated QoS | Quality of service | M | LV | 13-15 |
| | Radio priority | Radio priority | M | V | ½ |
| | Spare half octet | Spare half octet | M | V | ½ |
| 2B | PDP address | Packet data protocol address | O | TLV | 4-20 |
| 27 | Protocol configuration options | Protocol configuration options | O | TLV | 3-253 |
| 34 | Packet Flow Identifier | Packet Flow Identifier | O | TLV | 3 |

The PDP address IE is included in the attach accept message if the WTRU has requested the activation of a PDP context with the PDP type IPv4 or IPv6 and dynamic addressing. The protocol configuration options IE is included in the attach accept message when the CN wishes to transmit protocol data (e.g., configuration parameters, error codes or messages/events) to the WTRU. The packet flow ID IE may be included if the CN wants to indicate the packet flow ID associated to the PDP context. The CN shall not include this IE if the WTRU has not indicated PFC procedure support in PFC feature mode field of WTRU network capability IE. If the WTRU has not indicated PFC procedure support, then it shall ignore this IE, if received.

The Negotiated LLC SAPI, Negotiated QoS, Radio priority and Spare half octet are IEs used to map the service to the right end point within the network with the right setting. The LLC SAPI, identifies the Service Access Point Identifier in both the WTRU, the E-UTRAN and the evolved CN. This ensures that the traffic flow of a particular service is routed via the same nodes for uplink and downlink. Negotiated QoS is the set of attributes for the traffic flow that specify the resources to be allocated, such as bit-rate, delay, bit-error rate, PDU sizes, or the like. Radio priority IE sets up the class of the data traffic for the RAN.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a wireless transmit/receive unit (WTRU), the method comprising:
sending an attach request message to a core network, wherein the attach request message includes an identifier of the WTRU and an attach type;
receiving an attach accept message from the core network, wherein the attach accept message is responsive to the attach request message and includes Quality of Service (QoS) information, Access Point Name (APN) information, and an Internet Protocol (IP) address for the WTRU;
transmitting an attach complete message to the core network in response to the attach accept message; and
communicating data using the IP address.

2. The method of claim 1 wherein the identifier of the WTRU is an international mobile subscriber identity (IMSI).

3. The method of claim 1 wherein the identifier of the WTRU is a packet temporary mobile subscriber identity (P-TMSI), and a routing area identity (RAI).

4. The method of claim 1 further comprising:
performing an authentication procedure.

5. The method of claim 1 further comprising:
the WTRU performing an international mobile equipment identity (IMEI) checking procedure.

6. The method of claim 1 wherein the attach type indicates an evolved universal mobile telecommunication system (UMTS) terrestrial radio access network (E-UTRAN) only attachment.

7. The method of claim 1 wherein the attach type indicates an evolved universal mobile telecommunication system (UMTS) terrestrial radio access network (E-UTRAN) and IMSI attachment.

8. The method of claim 1 wherein the attach accept message includes information related to at least one of a Packet Data Protocol (PDP) type, a PDP address, a transaction identifier (TI), quality of service (QoS), a radio priority, a packet flow identifier, or a PDP configuration.

9. The method of claim 1 further comprising:
the WTRU constructing a session and mobility management (SMM) context for session mobility (SM) and mobility management (MM) for the WTRU.

10. The method of claim 9 wherein a state of the SMM is defined as one of an MM-detached and SM-inactive state, an MM-connected and SM-active state and an MM-idle and SM-active state.

11. The method of claim 9 wherein an SMM state of the WTRU changes depending on allocation of an IP address to the WTRU.

12. A wireless transmit/receive unit (WTRU) comprising:
a transceiver configured:
to send an attach request message to a core network, wherein the attach request message includes an identifier of the WTRU and an attach type;
to receive an attach accept message from the core network, wherein the attach accept message is responsive to the attach request message and includes Quality of Service (QoS) information, Access Point Name (APN) information, and an Internet Protocol (IP) address for the WTRU;
to transmit an attach complete message to the core network in response to the attach accept message; and
to communicate data using the IP address.

13. The WTRU of claim 12 wherein the identifier of the WTRU is an international mobile subscriber identity (IMSI).

14. The WTRU of claim 12 wherein the identifier of the WTRU is a packet temporary mobile subscriber identity (P-TMSI) and a routing area identity (RAI).

15. The WTRU of claim 12 wherein the attach type indicates an evolved universal mobile telecommunication system (UMTS) terrestrial radio access network (E-UTRAN) only attachment.

16. The WTRU of claim 12 wherein the attach type indicates an evolved universal mobile telecommunication system (UMTS) terrestrial radio access network (E-UTRAN) and IMSI attachment.

17. The WTRU of claim 12 wherein the attach accept message includes information related to at least one of a Packet Data Protocol (PDP) type, a PDP address, a transaction identifier (TI), quality of service (QoS), a radio priority, a packet flow identifier, or a PDP configuration.

18. The WTRU of claim 12 wherein a session and mobility management (SMM) context is maintained for session management (SM) and mobility management (MM) for the WTRU.

19. The WTRU of claim 18 wherein a state of the SMM is defined as one of an MM-detached and SM-inactive state, an MM-connected and SM-active state and an MM-idle and SM-active state.

20. The WTRU of claim 18 wherein an SMM state of the WTRU changes depending on allocation of an IP address to the WTRU.

* * * * *

UNITED STATES PATENT AND TRADEMARK OFFICE
CERTIFICATE OF CORRECTION

| | | |
|---|---|---|
| PATENT NO. | : 8,072,948 B2 | Page 1 of 1 |
| APPLICATION NO. | : 11/485082 | |
| DATED | : December 6, 2011 | |
| INVENTOR(S) | : Kamel M. Shaheen | |

It is certified that error appears in the above-identified patent and that said Letters Patent is hereby corrected as shown below:

ON THE TITLE PAGE

Item (56), OTHER PUBLICATIONS, page 2, right column, before "* cited by the examiner", insert --3GPP, "3rd Generation Partnership Project; Technical Specification Group Services and System Aspects; General Packet Radio Service (GPRS); Service Description; Stage 2 (Release 6)," 3GPP TS 23.060 V6.13.0, (June 2006).--.

Signed and Sealed this
Twenty-fourth Day of July, 2012

David J. Kappos
*Director of the United States Patent and Trademark Office*